United States Patent
McGoldrick (10) Patent No.: US 9,102,887 B2
(45) Date of Patent: Aug. 11, 2015

(54) PELLETS AND PROCESSES THEREFOR

(75) Inventor: Fredrick McGoldrick, Louth (IR)

(73) Assignee: Silform Technologies Ltd., County Antrim (GB)

( * ) Notice: Subject to any disclaimer, the term of this patent is extended or adjusted under 35 U.S.C. 154(b) by 259 days.

(21) Appl. No.: 13/559,057

(22) Filed: Jul. 26, 2012

(65) Prior Publication Data

US 2012/0285082 A1    Nov. 15, 2012

Related U.S. Application Data

(63) Continuation-in-part of application No. PCT/GB2011/050135, filed on Jan. 28, 2011.

(51) Int. Cl.

| | |
|---|---|
| *C10L 1/18* | (2006.01) |
| *C10L 5/14* | (2006.01) |
| *C10L 5/44* | (2006.01) |
| *C10L 9/10* | (2006.01) |
| *C22B 1/242* | (2006.01) |
| *C22B 1/245* | (2006.01) |

(52) U.S. Cl.
CPC ... *C10L 5/14* (2013.01); *C10L 5/44* (2013.01); *C10L 9/10* (2013.01); *C22B 1/242* (2013.01); *C22B 1/245* (2013.01); *Y02E 50/10* (2013.01); *Y02E 50/30* (2013.01)

(58) Field of Classification Search
CPC .............. C09D 1/00; C10L 5/42; C10L 5/44; C10L 5/46; C10L 5/14; C10L 5/10; C22B 1/242; C22B 1/245; Y02E 50/10; Y02E 50/30
USPC ............................................ 44/542; 106/287
See application file for complete search history.

(56) References Cited

U.S. PATENT DOCUMENTS

| | | | |
|---|---|---|---|
| 334,407 | A * | 1/1886 | Irani et al. ................. 292/331 |
| 3,344,077 | A * | 9/1967 | Irani et al. ................. 510/469 |
| 3,377,146 | A | 4/1968 | Von Stroh |
| 3,876,416 | A | 4/1975 | Yamaki et al. |
| 4,025,596 | A | 5/1977 | Parks et al. |
| 4,133,718 | A | 1/1979 | Jaquay |
| 4,219,519 | A | 8/1980 | Goksel |
| 4,357,145 | A | 11/1982 | Dondelewski |
| 4,417,899 | A | 11/1983 | Morris et al. |
| 4,541,833 | A | 9/1985 | Mueller |

(Continued)

FOREIGN PATENT DOCUMENTS

| | | |
|---|---|---|
| BR | PI 9806675-7 A | 4/2000 |
| CN | 101407860 | 4/2009 |

(Continued)

OTHER PUBLICATIONS

Sastry, K., Pelletisation of Coal Fines: An Experimental Study, Melbourne, Vic, Sep. 11-13, 2000, Minprex 2000, pp. 315-320.

(Continued)

*Primary Examiner* — Prem C Singh
*Assistant Examiner* — Latosha Hines
(74) *Attorney, Agent, or Firm* — Stephen J. Stark (57) ABSTRACT

A pellet binder is described comprising silicate 60-97 by wt %, catalyst 3-40 by wt %, and the balance as water. The catalyst comprises glycol at 10-40 wt %, sulphonate at 10-20 wt % and sulphate 5-10 wt %. Such a pellet binder can be used in various processes for producing commercially useful pellets.

20 Claims, 4 Drawing Sheets

(56) References Cited

U.S. PATENT DOCUMENTS

| | | | |
|---|---|---|---|
| 6,013,116 A | 1/2000 | Major et al. | |
| 6,530,066 B1 | 3/2003 | Kriech et al. | |

FOREIGN PATENT DOCUMENTS

| | | | |
|---|---|---|---|
| DE | 3445503 | | 6/1986 |
| DE | 4337404 | A1 | 8/1994 |
| DE | 19814616 | A1 | 7/1999 |
| EP | 1541533 | A1 | 6/2005 |
| FR | 964785 | | 8/1950 |
| GB | 216948 | A | 6/1924 |
| GB | 305051 | | 1/1929 |
| GB | 723478 | | 2/1955 |
| GB | 787993 | | 12/1957 |
| GB | 891731 | | 3/1962 |
| GB | 1292799 | | 10/1972 |
| GB | 1292799 | A * | 10/1972 |
| GB | 2037809 | | 7/1980 |
| GB | 2079780 | | 1/1982 |
| GB | 2103237 | | 2/1983 |
| GB | 2211513 | | 7/1989 |
| JP | 62273300 | | 11/1987 |
| JP | 2007191748 | | 8/2007 |
| JP | 2007224034 | | 9/2007 |
| UA | 38747 | | 3/2005 |
| WO | WO 2006/003354 | A1 | 1/2006 |
| WO | WO 2006/003444 | A1 | 1/2006 |
| WO | WO 2007080356 | A1 * | 7/2007 |
| WO | WO 2009/147360 | A1 | 12/2009 |
| WO | WO 2009/147361 | A1 | 12/2009 |
| WO | WO 2010/070328 | A1 | 6/2010 |

OTHER PUBLICATIONS

International Search Report, PCT/GB/2004/002936, Dec. 1, 2006.
International Search Report, PCT/GB2005/002635, Dec. 1, 2006.
UK Patent Office Search Report, PCT/GB0513780.7 (Granted Patent No. 2416542B), Nov. 21, 2005.
International Search Report, PCT/GB2011/050135, Aug. 4, 2011.

* cited by examiner

PELLETS AND PROCESSES THEREFOR

CLAIM OF PRIORITY

This application is the national stage of PCT/GB2011/050135 filed Jan. 28, 2011 which claims priority to GB 1001544.4 filed Feb. 1, 2010, the disclosures of which are incorporated in their entirety by reference herein.

FIELD OF THE INVENTION

The present invention relates to pellets such as fuel products, and various processes for making same using a pellet binder.

A continuing problem in many solid-based fuel extraction processes is dealing with waste 'fine' materials. As much as 10% of run-of-mine coal can end up as fine (<3 mm) or ultra fine (<0.1 mm) coal dust. One solution has been to form briquettes. These are formed by compressing the fines at very high pressures to physically form a secondary fuel material. However, the high capital and operating costs of briquetting plants have prevented their use beyond some high cost countries. In many places, coal fines are currently simply 'dumped' near the coal mine.

Meanwhile, another material that is currently deemed unusable is metal ore 'fines'. As much as 10 or 20% of ore processing and grinding can result in 'fines' (generally about less than 2-3 mm) or ultra fines (micron or sub-micron size). Like coal fines, metal ore fines are unsuitable for subsequent industrial processes, and are generally deemed to be waste material. One known process for their use involves rolling, roasting and subsequent heating the fines to a very high temperature in order to form ore 'marbles'. However, significant machinery is required for this process, and it is not generally economically viable to pursue.

Also meanwhile, it is desired to gain energy from biomass. Energy produced from biomass residues displaces the production of an equivalent amount of energy from fossil fuels, leaving the fossil carbon in storage. It also shifts the composition of the recycled carbon emissions associated with the disposal of the biomass residues from a mixture of $CO_2$ and $CH_4$, to almost exclusively $CO_2$. In the absence of energy production applications, biomass residue carbon would be recycled to the atmosphere through some combination of rotting (biodegradation) and opening burning. Rotting produces a mixture of up to fifty percent $CH_4$, while open burning produces five to ten percent $CH_4$. Controlled combustion in a power plant converts virtually all of the carbon in the biomass to $CO_2$. Because $CH_4$ is a much stronger greenhouse gas than $CO_2$, shifting $CH_4$ emissions to $CO_2$ by converting biomass residues to energy significantly reduces the greenhouse warming potential of the recycled carbon associated with other fates or disposal of the biomass residues. However, there is not to date any efficient method of using biomass for energy production.

SUMMARY OF THE INVENTION

It is an object of the present invention to provide a pellet binder to make various types of fuel products or other useful products from fine particulate materials, and various processes for making same.

According to one aspect of the present invention, there is provided a pellet binder comprising

|  | wt % |
|---|---|
| Silicate | 60-97 |
| Catalyst | 3-40 |
| Water | balance | wherein the catalyst comprises

|  | wt % |
|---|---|
| Glycol | 10-40 |
| Sulphonate | 10-20 |
| Sulphate | 5-10 |
| Water | balance |

Optionally, the binder also includes a preservative at 0.005 wt %.

The silicate is preferably sodium silicate or potassium silicate.

BRIEF DESCRIPTION OF THE DRAWINGS

The particular features and advantages of the invention as well as other objects will become apparent from the following description taken in connection with the accompanying drawings in which:

In the following discussion of the invention, and unless stated to the contrary, the disclosure of alternative values for the maximum or minimum, or upper or lower limit of the permitted range of a component, optionally coupled with an indication that one of said values may be more preferred than the other, is to be construed as an implied statement that each intermediate value of said component is itself independent relative to any other value, and also to each value lying between said preferred values and said intermediate value. Thus, any range of the values as stated herein for a component is possible for selection for each component as its permissible range.

The silicate component in the pellet binder has a minimum of 60 wt %, optionally a minimum of 65, 70 or 75 wt %. The silicate component has a maximum of 97 wt %, optionally 96 or 95 wt %. In one embodiment the silicate comprises 75-96 wt %.

The catalyst component of the binder has a minimum of 3 wt %, optionally 4 or 5 wt %. The catalyst component has a maximum of 40 wt %, optionally a maximum of 35, 30, 25 or 20 wt %. In one embodiment, the catalyst comprises 5-20 wt %.

The glycol component in the catalyst has a minimum of 10 wt %, optionally a minimum of 15, 20, 25 or 30 wt %. In one embodiment the glycol comprises 30-40 wt %.

The sulphonate component in the catalyst has a minimum of 10 wt %, optionally a minimum of 11, 12, 13, 14 or 15 wt %. In one embodiment the silicate comprises 30-40 wt %.

In another embodiment of the present invention, the sulphonate is a linear alkyl benzene sulphonate.

In another embodiment of the present invention, the sulphonate is a sodium salt.

Thus, possible sulphonates include benzenedodecylsulfonic acid, sodium salt, benzenesulphonic acid, mono-C10-14 alkyl derivatives, sodium salt etc. Preferably, the sulphonate is sodium dodecyl benzene sulphonate.

In another embodiment of the present invention, the sulphate is a fatty alcohol sulphate or an alkyl sulphate. The sulphate may also be one of various salts such as ammonium, magnesium, isopropylamine. Possible sulphates include Poly(oxy-1,2-ethanediyl), a-sulfo-w-hydroxy-, C12-14alkyl ethers, sodium salts, Poly(oxy-1,2-ethanediyl), a-sulfo-w-hydroxy-, C16-18-alkyl ethers, sodium salts etc.

In another embodiment, the sulphate is a sodium salt. Preferably, the sulphate is sodium lauryl ether sulphate.

In another embodiment of the present invention, the glycol is a diol, optionally an alkyl or alkylene diol, for example. ethylene glycol (ethane 1,2-diol) propylene glycol (1,2-dihydroxypropane or 1,2-propanediol), and butylene glycol (1,2-, 1,3-, or 2,3-butanediol).

Preferably, the glycol is ethylene glycol.

Such a pellet binder can be used in various processes for producing commercially useful pellets. These include:
1. A process for producing pellets from at least a particulate material and the pellet binder, comprising of the following steps:
   admixing the particulate material and binder, and
   agglomerating the so-formed mixture by tumbling.

This can form rigid fuel pellets from a particulate carbon-based material, preferably wherein the particulate material is coal dust or coal fines, partly, substantially or wholly peat, or a combination thereof.

Process (i) could be for producing rigid fuel pellets from a particulate carbon-based material, wherein the binder includes one or more surfactants able to form rigid fuel pellets as the process is carried out at ambient temperature.

The process could be carried out as a single stage process.
(ii) A process for producing metal ore pellets from a particulate carbon-based material and a metal ore material, with the binder. Preferably, the metal ore material is iron ore, more preferably the iron ore is iron ore fines and/or ultrafines of a size less than 2 mm.
(iii) A process for producing rigid fuel pellets from a biomass material and the pellet binder, comprising the steps of:
  (a) admixing the biomass material and binder, and
  (b) agglomerating the so-formed mixture by tumbling at ambient temperature to form the rigid pellets.

The process (iii) may further comprise the step of; c) drying the rigid pellets using a flow of air.

Preferably steps (a), (b) and (c) are carried out contemporaneously.

The drying step can be performed for less than 1 hour, preferably less than 30 minutes.

Process (iii) may include the addition of a particulate carbon-based material, preferably coal fines or dust.
(iv) A process for producing layered rigid fuel pellets comprising:
  a biomass material
  a particulate carbon-based material, and
  the pellet binder,
  the process comprising at least the steps of:
  admixing one of the biomass material and the particulate carbon-based material with the binder;
  agglomerating the first so-formed mixture by tumbling at ambient temperature to form core pellets;
  admixing the other of the biomass material and the particulate carbon-based material with the binder; and
  agglomerating the second so-formed mixture around the core pellets by tumbling at ambient temperature to form the pellets.

The biomass material could be wood including wood fines or wood dust, and/or chicken litter.

The moisture content of the biomass material could be up to 70 wt %; preferably the moisture content of the biomass material is up to 20 or 25 wt %

The dry solids content of the biomass material is preferably 1 mm or less in size includes at least 40% of such material being of a sub-micron size.

Process (iv) could provide a layered rigid fuel pellet comprising one or more further layers of biomass material and/or particulate carbon-based material.

The binder could be added in the range 1-10 wt % of each of the biomass material and the particulate carbon-based material, preferably 3-7 wt %.

Any water added to provide a combined liquid component with the binder could be added in the range 10-40 wt %, preferably 20-30 wt %, of each of the biomass material and the particulate carbon-based material.

The biomass material may be one or more of the group comprising: wastewater sludge, sewerage sludge, chicken litter, bonemeal, spent mushroom compost, wood, plant residues including rape seed, hemp seed, corn and sugar cane residues.

Biomass materials usable with the present invention include any material generally of a biological origin, generally being carbon based and usually based on recently living biological material, as opposed to coal and other fossil fuels. Such materials include sludges such as waste water sludge and sewerage sludge, chicken litter, bone-meal, spent mushroom composts, woods, organic plant material or residues or products, usually by-products, etc.

One legal definition of biomass is from The Biomass Research and Development Act of 2000 (P.L. 106-224; Title III), which defines biomass as "any organic matter that is available on a renewable or recurring basis, including agricultural crops and trees, wood and wood wastes and residues, plants (including aquatic plants), grasses, residues, fibers, and animal wastes, municipal wastes, and other waste materials."

The Directive 2001/77/EC of the European Parliament and of the Council of 27 Sep. 2001 defines biomass as the biodegradable fraction of products, waste and residues from agriculture (including vegetal and animal substances), forestry and related industries, as well as the biodegradable fraction of industrial and municipal waste.

The Renewables Obligation Order (Northern Ireland) 2007 (no 104) entitled Electricity, defines 'biomass' as fuel used in a generating station of which at least 90 percent of the energy content (measured over such a period and with such frequency as the Authority deems appropriate) is derived from plant or animal matter or substances derived directly or indirectly therefrom (whether or not such matter or substances are waste) and includes agricultural, forestry or wood wastes or residues, sewage and energy crops.

A sludge material biomass is preferably dewatered sludge i.e. reduced water content. This allows for easier combustion of the sludge once pelletized and less energy requirements for the incinerator to deal with any excess water. Untreated sludge usually contains around 6% dry solids (d.s.) content and 94% water content. For incineration purposes the sludge is preferably dewatered to produce a cake of around 25-28% d.s. As a combustion plant performs best in a continuous mode of operation, this will favour the selection of centrifuges or filter belt presses for dewatering.

In particular, the present invention is able to use sludge material which can be derived from any definition of sludge including wastewater sludge, sewage sludge or 'biowaste', which, once treated, preferably has a moisture level of 20-40%, frequently 25-30%, which is a commonly available form of dewatered sludge. Further dewatering or drying of the sludge is unnecessary, reducing significantly the energy input required to provide a useable fuel product. If the process of the present invention uses for example, and not being limited thereto, 1 MW of energy for the process to provide the pellets based on such sludges, then this can be compared with the requirement of 12.5 MW mentioned above for the need to further dry dewatered sludge for its use in prior art incineration processes. The present invention is therefore at least three or four times more efficient in terms of electricity generated by the burning of the pellets compared with prior art incineration of processed sludge.

Woods can include any waste wood material, generally being in a dust or 'fine' form, or able to be provided in such form. Processes such as torridfication are known for making wood fines, and wood fines and dust are also natural by-products in many wood shaping, forming or manufacturing processes or industries.

Chicken litter, bone meal and spent mushroom compost are biomass materials, much of which can already be in a fine or particulate mode.

Chicken litter or poultry manure is by-product of poultry farming and can be used as an effective biomass energy source. In agriculture, poultry litter or broiler litter is a material used as bedding in poultry operations to render the floor more manageable. Common litter materials are wood shavings, sawdust, peanut hulls, shredded sugar cane, straw, and other dry, absorbent, low-cost organic materials. Sand is also occasionally used as bedding. After use, the litter consists primarily of poultry manure, but also contains the original litter material, feathers, and spilled feed.

In the use of organic plants such as rapeseed or hemp seed, corn, sugar cane, etc, from which products such as oils such as linseed oil are produced, again there is commonly a significant proportion of waste material in a fine or particulate form. Rapeseed dust and hemp seed dust are known by-products of processes using rapeseed or hemp seed.

Similar by-products are formed in the use of other organic plant materials. In the present invention, the biomass material may be one or more biomass materials as herein described. Where two or more biomass materials are used, they may be pre-mixed prior to admixing with the binder, or each biomass material is brought together either simultaneously or separately with the binder.

The tumbling action in the above processes, such as in a rotary drum, serves to agglomerate the particles and bind the mixture into the pellets, usually with a variable size distribution. No mechanical compression force is required, (with its attendant low production rate and high cost), and the processes of the present invention can be carried out at ambient or near-ambient temperature.

Preferably, the processes provide pellets having a hardened outer portion, skin, casing or shell. More preferably, the interior of the pellets is dry, and wholly or substantially in an internal dust-like, particulate and/or powderous form. One way of achieving this is to allow the formed pellets to dry at ambient temperatures.

In one embodiment of the present invention, water is part of the material and binder mixture, either by being part of the material, part of the binder, added separately, or a combination of any of these.

The amount of water needed or desired for the processes of the present invention may depend upon the nature of the particulate material and the binder. In some circumstances, it is preferred to have a dry particulate material. In other circumstances, the material may be derived from a wet fuel source, such as peat and coal tailings dams, and any reduction in the amount of drying needed (compared with for example the briquetting process) reduces the overall energy input required to form the fuel product.

It is a particular advantage of the present invention that it can use any type of 'wet' or 'dry' particulate material, generally without significant further processing of the material prior to its suitability for use at least one of the processes of the present invention.

The ability of the present invention to work on 'wet' and 'dry' particulate materials provides yet another advantage. For example, at some power stations, there is currently "½ million tonnes a year of 'unusable coal' product in stockpiles, as it is too wet, Le. its moisture content is too high, for efficient burning. Freshly mined coal can have a moisture content of 12-15%, but some mined coal can end up with a moisture content of up to 30%. To drive off this level of moisture (by turning it into steam) prior to any combustion of the actual coal requires so much energy to start with, that this coal is simply not used, as it is not efficient. Grinding such coal to be more 'burnable' is also inefficient as the moisture-rich coal generally clogs up the grinder.

At least process (i) of the present invention is directly usable with moisture-rich coal fines and similar products, as any water content of the binder can be reduced in line with the level of moisture in the coal without affecting the process. Once the pellets have been formed, their hardened shell stops or significantly reduces water ingress, especially if waterproofing additives are used. Once fully 'dry', the pellets can have a moisture content of at least half that of the particulate starting material, and possibly less than 5%, and thus be sufficiently dry for easy grinding to form a suitable fuel product for a power station.

Thus, the present invention also provides significant moisture reduction in a fuel product, converting an inefficient fuel product into an efficient fuel product.

In a preferred embodiment of the present invention, the amount of water for the processes is adjusted in the binder component prior to its admixing with the particulate material. The calculation of this binder to water adjustment is dependent on the moisture content of the particulate material.

According to another embodiment of the present invention, the particulate material is generally of a maximum size or grade of 3 mm or lower. Coal 'dust' or 'fines' can often be of a sub-micron size. Peat is a fuel material which is generally dried/shredded/dried/crushed prior to briquetting. Some shredding of the peat material may still be required to provide a particulate material suitable for the present invention, but to a much lesser extent than that required for briquetting.

More preferably, the particulate material has a range of sizes or grades; preferably biased towards fine or finer particle sizes.

Carbon-based particulate material suitable for the present invention can be accepted wet or dry, and could be provided by any type of maceral fuel, including peat and lignite through to sub-bituminous coals, anthracite fines, petroleum coke fines and the like, as well as sewerage wastes, biomass, animal wastes and other hydrocarbon materials that could be considered a fuel source. The particulate material may also be a combination of two or more starting materials or 'ingredients', not necessarily premixed, and such as those hereinbefore mentioned, so as to provide 'hybrid' fuel pellets.

Suitable materials also include low grade or processed fuels, as well as hitherto 'waste' products, whose clean combustion would help lower overall pollution levels.

The present invention is not affected by high ash content or sulphur content in the particulate material.

The pellet binder of the present invention may be a homogeneous or heterogeneous material, such as cements and raw silicates like calcium, sodium or potassium.

The processes may include the addition of one or more further ingredients into the mixing, either separately or integrally with the binder. Such further ingredients include lime, organic binders, silicates, cements, and waterproofing additives. Lime or cement helps to inhibit sulphur emission upon burning of the so-formed pellets. A cementitious material can assist in the green-strength of the pellets, and possibly in forming the hardened outer surface or shell for the pellets as described hereinafter.

According to another embodiment of the present invention, the binder may include one or more surfactants.

One or more other mineral additives such as zeolites or vermiculite could also be used as a further ingredient to help bind any metallic contaminants in the ash of the pellets, and so prevent any soluble metals being released from the ash.

The particulate material and binder, and any other separate reagents or ingredients to be added, can be admixed using any known process or arrangement, including simple mixing. Because the next step of the process is a tumbling action, absolute homogenous mixing of the reagents or ingredients prior to the process is not essential, as the tumbling action will generally further the mixing action if necessary or desired. In some circumstances, the admixing may at least partly occur during the tumbling action, such that the steps of the invention may not be wholly distinct.

In one embodiment of the present invention, the binder is coated on to the particulate material. One method of coating is to spray the binder on to the material.

In another embodiment of the present invention, the particulate material is moving prior to and/or during mixing with the binder, and/or the material is in a dispersed arrangement. One particular suitable form of this is a falling curtain of particulate material, such as at conveyor transfers, inside pelletizing drums or pans, and from stockpile load outs, etc.

In another embodiment of the present invention, the particulate material and binder are directly and/or immediately undergo tumbling after their contact with each other.

The tumbling action serves to agglomerate the particulate material and binder mixture to form particles of greater and greater size, generally having a spherical or ovoid shape. The size of the so-formed pellets can be adjusted based on the process conditions for tumbling, such as rotation speed, moisture content, impact force and duration. The pellets could also be screened and/or recycled during or after pelletizing to produce a desired, e.g. narrower, size distribution.

One suitable apparatus for providing tumbling action is a rotary drum. Rotary drums are well known in the art. Their output can be dependent upon the length, diameter, speed of rotation and angle of mounting of the drum, and the output can vary from single figure tonnes per hour, to hundreds of tonnes per hour per drum.

The general sizes and dimensions of agglomerator drums, such as pan, rotary and conical drums, are known in the art, as are their process variations to provide variation in the products formed. See for example UK Patent No 787993.

Rotary drums have low capital and low operating costs, especially in comparison with briquetting plants. They can even be provided in mobile form, such that the process of the present invention can be provided where desired or necessary, e.g. moved and located to where a particulate material is currently stored or 'dumped', rather than requiring significant movement (and therefore cost) for transporting the material to a fixed processing site.

The agglomeration action may be carried out in one or more stages, either connected, such as the tumbling conditions changing in the same drum or the material being fed directly into another agglomerator, or separate. In one arrangement for multi-stage agglomeration, the tumbling conditions are variable or varied for each stage. The conditions may be altered either in a continuous manner or action, or discretely.

Where the process of the present invention involves tumbling the mixture in a rotary drum, one or more rotary drums may be used for the agglomeration.

The surfactant action serves to draw the binder towards the surface of the forming pellets, such that once cured, the pellets have a harder outer portion, skin, shell or surface, compared to their interior. Thus the pellets have a variable density towards the core; the density being greater at the surface. Indeed, the 'shell' will generally have a high density in comparison with the lower density of the 'interior'.

More preferably, the pellets have sufficient hardness once cured to allow handling, stacking and/or transportation without any significant breakage.

The curing of the pellets may start during or be part of the agglomeration action. Alternatively, the curing may wholly or substantially be a separate step of the process of the present invention, either occurring as a continuous part of the agglomeration tumbling, or as a separate step or steps thereafter.

Preferably, the agglomerated pellets formed by the present invention are rested or tumbled more gently for a short period, generally a number of minutes, prior to undergoing a curing and/or polishing step. This curing and/or polishing step could be provided by further tumbling action, for instance in the same or another rotary drum. If necessary or desired, a cementitious material could be added to the pellets at this stage. This should decrease the curing process time, and/or provide a stronger initial green strength to the pellets to aid handling, etc.

The method of the present invention may include one or more sizing steps. That is, to grade the size of the so-formed pellets to that desired or necessary. This could include extracting those pellets which are damaged or undersized, which pellet material could be recycled back into the process of the present invention.

Following initial curing, the formed pellets are preferably allowed to be rested for some time, possibly a number of days such as 3-7 days, to provide or allow for any final curing. Like other curing products, the pellets continue to cure to gain strength over time, such as a further number of days or weeks.

According to another aspect of the present invention, there is provided a process for encapsulating a particulate material, comprising the steps of:

admixing the material with a pellet binder as defined herein, and allowing the mixed material to cure.

The particulate material may be any material that has a fine distribution, generally dust-like materials such as uranium tailings dust and waste, coal dust and fly ash waste, asbestos, metal ores, metals such as gold, copper or iron, whether elemental or in compound form such as ores, and vehicle-surface materials such as road-surfacing materials. Indeed any fine material, whose agglomeration, solidification or encapsulation would be beneficial.

The method of admixture may be any form of mixing, including coating, spraying, injecting, etc. Generally, the process can be carried out at ambient or near-ambient temperature, so allowing the process to occur in situ.

The process conditions and parameters and the form of the binder and possible other ingredients as described hereinbefore are applicable to this process also.

In particular, the present invention provides a single-stage process for producing pellets at ambient temperature from at least a particulate material and a pellet binder as defined herein, comprising of the following steps:
  a) admixing the particulate material and binder;
  b) agglomerating the so-formed mixture by tumbling; and
  c) curing the pellets after tumbling at ambient temperature to form rigid pellets having a hardened shell.

According to another aspect of the present invention, there is provided a fuel pellet product formable by agglomeration of a particulate material and a binder as defined herein, preferably at or near ambient temperature.

According to another aspect of the present invention, there is provided a fuel pellet product comprising an agglomerated composition of a particulate carbon-based material and a binder as defined herein.

According to another aspect of the present invention, there is provided a fuel or encapsulated pellet product whenever formed by a process as herein described.

The fuel pellet product of the present invention is a material which is easily storable. It is also easily transportable due to its variable diameter distribution. This enhances stacking concentration, which also reduces abrasion and consequential breakage of the pellets.

The product of the present invention is ready for use as a fuel in many situations, e.g. domestically such as in a home fire, industrially, such as in a power plant, etc.

The product is formed from currently 'waste' materials, thereby increasing the efficiency of current solid-fuel extraction and production.

The product preferably allows a very high percentage of combustion (possibly 100% combustion), so as to leave little or no combustible fuel in the ash.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Embodiments of the present invention will now be described by way of example only, and with reference to the accompanying drawings in which:

FIG. 1 is a flow diagram of a process according to one embodiment of the present invention;

FIG. 2 is a front view of tumbling action of agglomerating pellets according to the present invention;

FIG. 3 is a view of a number of pellets according to another embodiment of the present invention;

FIG. 4 is a graph of moisture and strength over time for pellets of FIG. 3; and FIG. 5 is a perspective view of a mobile agglomeration unit useable with the present invention.

Fine coal recovery systems are now a common part of modern coal process operations, but there has been a requirement for a cost effective high tonnage solution for utilizing the wet coal fines generated by the various beneficiation (benefaction) processes.

High capital and operating costs of briquetting plants have prevented numerous operations from maximizing their coal reserves. Briquetting is a process where some type of material is compressed under high pressure. Compression of the material causes the temperature to rise, which makes the raw material liberate various adhesives.

There are low-priced hydraulic briquetting presses which are designed to operate for only a number of hours a day. Bigger mechanical presses are used for large-scale installations making hundreds of kilograms per hour, but these require approximately 200 kWh energy input (for drying and processing) per tonne of briquetting material. The cost of this is prohibitive in countries where the cost of coal is already low, such that coal fines are currently simply dumped on nearby ground in many countries around the world.

Similarly, the current method of forming peat briquettes requires initial drying of the dug peat to about 55% moisture, shredding, further drying to a lower moisture content, followed by crushing, followed by high pressure briquetting. Each mechanical step requires significant energy input.

Other waste materials include petroleum coke, a by-product from cracking oil, which currently has no beneficial use and is therefore also currently stockpiled or sold off at a very low cost.

The process of the present invention allows for use of all these materials in a cost-efficient process, to provide a beneficial fuel product.

Figure 1:
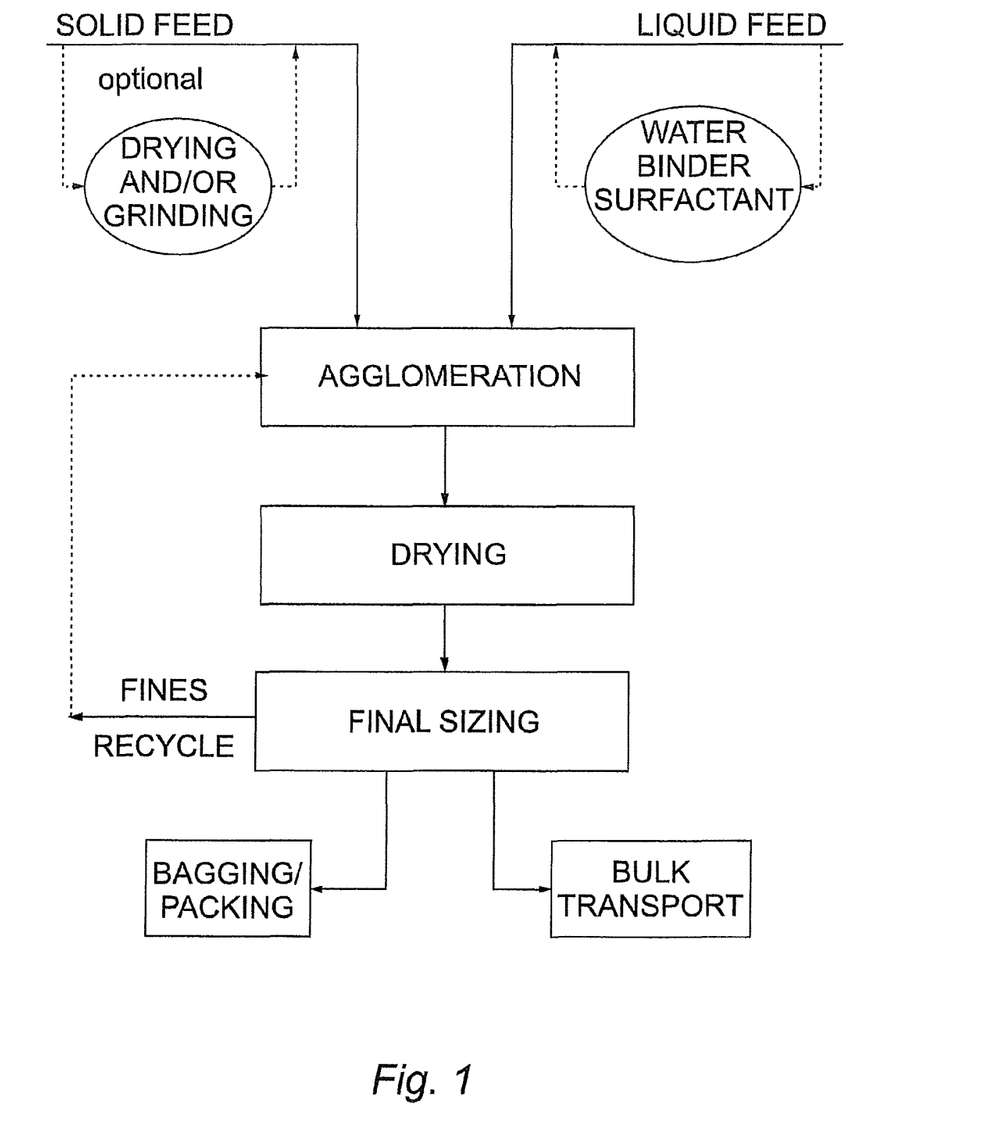
FIG. 1 is a flow chart showing a process of using a presently preferred embodiment of the invention.

FIG. 1 shows a flow diagram for an example of the process of the present invention.

EXAMPLE 1

In Stage 1—Preparation:

The raw fuel feed is prepared for agglomeration. Depending on its raw state it may need grinding, screening or drying. The finer the raw feed is, the more effective the process.

Depending on the moisture content and chemical characteristics of the raw fuel feed, the liquid feed is adjusted to suit. This will involve balancing the quantity of water relative to the binder and surfactants used.

The above parameters can be established during pre-testing of the process and apparatus. For coal fines agglomeration, it has been found that between 20-25% of liquid binder (to weight of raw feed) is generally needed for efficient agglomeration. Generally, the wetter the raw feed, the less water is required to be added at this stage.

Stage 2—Agglomeration

Figure 2:
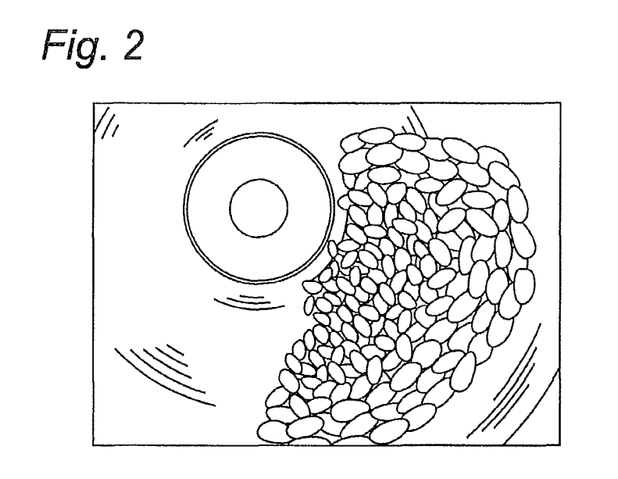
FIG. 2 is a front perspective view showing a portion of the process shown in FIG. 1.

The fuel feed is carried along and any dry reagents are added to the feed. It then falls from the end of a conveyor belt. The liquid binder is sprayed onto the falling curtain of fines, which together fall into a rotating drum, generally 1-5 m (such as 3 m) in diameter. As the mixture tumbles while being sprayed with the binder and water mixture, it forms small pellets which agglomerate and grow, forming pellets of desired shape and size as shown in FIG. 2.

The drum can be lined with loosely fitting heavy duty rubber sheet to avoid material sticking to the sides of the drum. The drum is set at an incline (e.g. 3-5%) to aid progression of the pellets therealong, and to control the residence time in the drum. The completed pellets exit at the opposite end of the drum onto another conveyor.

Pellets can be varied in size with only operational drum adjustments (speed of rotation, moisture content and longitudinal drum angle which directly affects residence time in the drum). Expensive mould changes, such as in present briquetting operations, are not required to vary the product dimensions.

Stage 3—Initial Curing/Polishing

At this stage, the pellets are green and must be handled carefully until the initial cure, which will take from 30-60 minutes, has taken place. After such time the green strength will have increased dramatically allowing stacking to take place.

This initial curing/polishing step, if necessary, may take place in another rotating drum, similar to but with larger diameter than the agglomerating drum. It may be of greater diameter and longer than the agglomeration drum. Here the pellets progress slowly through the drum, allowing sufficient time for the pellets to initially cure or receive surface treatment, and thereby allow handling and stacking. The residence time within this drum is dependent on the fuel characteristics, and its use can be determined in pre-production tests.

Selected surface treatment additives can be added at this stage to increase the surface area of the pellet skin, to prevent sticking, and/or to prevent leaking fluid into bags, etc.

Should the green strength of the pellets be poor, certain additional binders or cementitious chemicals can be added at stage 2 to rapidly speed-up the curing process, and thereby give quicker and stronger initial green strength to aid handling, etc. Broken and undersized pellets can be removed at this stage using for instance a slotted section of drum or a vibrating screen at the drum exit. The damaged and undersized pellets can then be returned to the agglomerating drum for reprocessing.

Stage 4—Stock Piling and Final Curing

Figure 3:
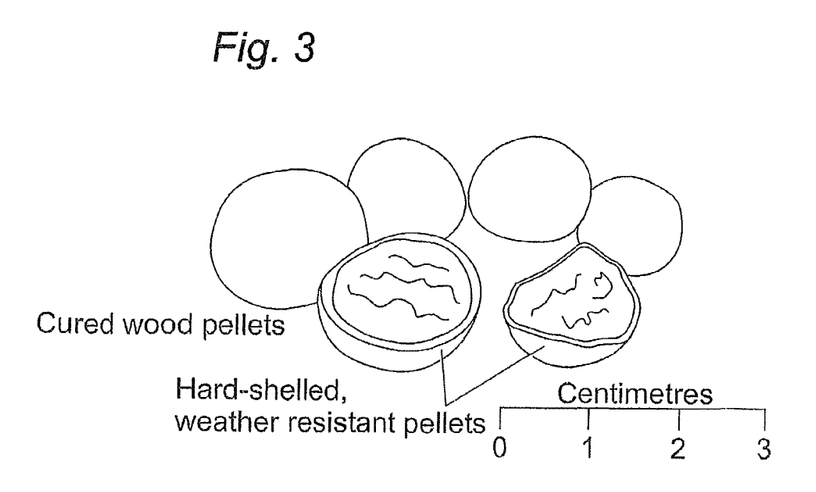
FIG. 3 is a perspective view of product taken from the process shown in FIGS. 1 and 2.

Following the initial cure/polishing stage the pellets are then stockpiled for final curing. During this time, generally between 3-7 days for coal fine pellets, and depending on ambient temperature, the pellets reach such strength as to allow more rigorous handling. No heating or force draught drying is required. An example of formed pellets is shown in FIG. 3.

The spherical shape of the pellets will allow air to move freely through the stockpile to assist the curing process and prevent heat build up and the risk of spontaneous combustion. At this stage, the pellets are also tightly sealed, preventing air ingress into the pellets, and so also slowing the effect or chance of any spontaneous combustion. If spontaneous combustion is still a problem, preventative reagents can be added during agglomeration.

Stage 5—Final Sizing (if Required)

At this stage the pellets can be further graded to the desired cross section if necessary. Any damaged and undersized pellets can then be returned to the agglomerating drum for reprocessing.

Stage 6—Transportation and Packing

Tumble and growth agglomeration can result in a wide variation in the final pellet size—as in natural lump coal. This has the advantage of lowering the bulking factor of the pelletized product, resulting in lower transportation costs.

The pellet sizing could even be designed to be made dependent upon proposed use. The pellet size can be adjusted by means of changes to process conditions, equipment configuration, and even reagent dosage. The formed product could then be bagged or stacked and allowed to cure at ambient temperatures, curing time being dependent upon local humidity. Generally, the higher the moisture content of the feed, the longer the pellets will require to be cured at ambient temperatures and humidity.

Process rates can be selected, but production rates of between 10-500 tonnes per hour of coal material per drum would be a general rate. The production rate can be scaled up using multiple process units, or scaled down with smaller equipment.

Production costs are dependent upon the production rate, particle size distribution of the feed, and characteristics of the particulate materials. However, energy input per tonne of product has been measured at approximately 0.5 to 2 kWh, at least a hundred times less than the energy input needed for briquetting.

In particular, the process of the present invention can be modified to treat very high ash and/or very high sulphur coals, as the pellets remain stable throughout the combustion process, allowing even for low rank coals to burn efficiently.

The present process is also suitable for fuel products that need to lower ash and sulphur to be sellable. The present process allows fine grinding to release contaminants by gravity or flotation methods, generating a much higher quality fuel source. The process also provides the manner of reforming the fine pure concentrate into a usable stable and valuable product form.

Sulphur emissions, even from very poor quality coal, can be wholly or substantially eliminated by simple adjustment of pelletizing additives, eliminating any sulphur dioxide pollution leading to acid rain. The process of pelletizing also simultaneously reduces fly ash by the inherent cementation, silicification and stabilization of the residual ash instigated by the reagents used. Additionally, higher product combustion temperatures are easier to generate due to high gas transfer rates, not only between the pellets, but also between particles within the pellets, providing more rapid and/or more controllable combustion than normal fuels; the higher temperatures tend to form clinker particulates as opposed to fly ash.

A further advantage of the present invention is the very complete combustion of the contained fuel in the pellets due to the high gas transfer rates and the maintenance of the integral structure of the pellets until combustion is complete. The retaining hardened shell, skin, etc, allows for significant heat increase or build-up inside the pellet, causing very high levels of combustion, resulting in the completion of any pre-designed chemical reactions in the interior content of the pellet. As the content is dry, generally of a 'fine' nature still, and is now pre-heated, rapid and so complete combustion of the content occurs. The pellets maintain their form even at white heat, and show very stable combustion characteristics.

In particular, the process of the present invention can involve no forced drying of the pellets because the action of any surfactant(s) used is maximized in ambient temperatures. Moreover, where water is used, the surfactant causes the binder-containing moisture to rapidly migrate to the surface of the pellet by capillary action, giving the 'egg shell' effect of a hardened surface and softer interior, due to the final heavy surface concentration of the binder. This results in a significantly enhanced skin strength, giving a very robust and low moisture content pellet (approximately 5%), which also resists moisture absorption from the air.

One further application of the present process is lowering the feed moisture of pulverized coal fuels in power and heat stations, where the coal fines or coal tailings are pelletized and allowed to thoroughly cure and dry before being pulverized and burnt in the furnace. The general moisture content found in current coal fines dumps is usually in the range 12-35%, making them very difficult to use or blend with other feeds.

As can be recognised from the above, the process of the present invention overcomes or solves a number of financial and operational problems.

Once the 'egg shell' effect has been fully developed after curing, the pellet will retain its strength even during white heat combustion. This allows high temperature reactions to take place inside the pellet resulting in much higher levels of combustion of the fuel, giving effective oxidation and sequestration of any contained sulphur, and negligible unburnt carbon levels in the residue ash. The shell effect allows the pellet to retain its structure during combustion, resulting in less particulate emissions in the flue gas.

The egg shell pelletization could also be used on sulphide concentrates and iron ores to allow the manufacture of pre-fluxed furnace feeds which can lead to 'sulphur emission free' smelter technology. This could be used in existing operations cost effectively with high industrial tonnage output.

The present invention provides significant benefits compared with present technologies, including:
- <3 mm coal/lignite fines can be pelletized dry or direct from a filtration plant.
- Tonnage throughput can be from 10 tones per hour (community size) up to 300 or 500 tonnes per hour per pelletizing line.
- High level of automation can be used during pelletizing for accurate control and reagent usage.
- Pellets just air dry while chemically 'curing'.
- Pellets can be handled by bulk handling equipment when cured or alternatively bagged when 'green',
- Pellet size can be customized from 5 mm to 150 mm if required depending upon coal characteristics and process parameters.
- Special heavy duty reagents can be added for high strength, for rapid cure, for high temperature strength, and for enhanced water resistance.'
- Pyrite removal can be reduced or eliminated due to various binder combinations to eliminate S02 due to gas transfer to form CaS04 inside the pellet.
- Due to excellent combustion characteristics, high ash coal fines will ignite and burn with high efficiency.
- Long lasting combustion, with high percentage carbon combustion.
- <20 mm coal can be crushed and pelletized with fines for high value pellets.
- Contaminated coal or waste products such as sawdust, rice husks, sewage, animal wastes, petroleum coke or waste oil can be included into the pellets.
- Residual ash has negligible un-burnt fuel (e.g. coal) residue and is excellent for other industrial uses.
- Residual ash can also be pelletized with similar binder reagents for concrete feedstock, aggregate blending and high porosity landfill.
- Lignite and peat can be treated with identical technology or can be blended with other fuel sources to create hybrid pellet fuels with predesigned characteristics such as smokeless burning.

Further examples of pellets formed by the present invention based on carbon-based starting materials are listed hereafter.

Fuel #1—Sub-Bituminous Coal Fines
 −3 mm fraction
 15% moisture
 45% ash
 0.4% sulphur
 25 mm pellets +/−5 mm formed
Fuel #2—Sub-Bituminous Coal Fines
 −3 mm fraction
 15% moisture
 45% ash
 0.4% sulphur
 15 mm pellets +/−5 mm formed
Fuel #3—Anthracite Coal Fines
 −2 mm fraction
 5% moisture
 15% ash
 0.1% sulphur
 25 mm pellets +/−5 mm formed
Fuel #4—Lignite Fines
 −5 mm fraction
 20% moisture
 28% ash
 0.1% sulphur
 20 mm pellets +/−5 mm formed
Fuel #5—Raw Peat
 Shredded to −40 mm
 30% moisture
 35% ash
 0.1% sulphur
 10 mm, 25 mm and 50 mm pellets +/−5 mm formed
Fuel #6—Sub-Bituminous High Sulphur Coal Fines
 −3 mm fraction
 15% moisture
 35% ash
 2.0% sulphur
 25 mm pellets +/−5 mm formed The present invention provides a simple but efficient process for using waste carbon-based materials, and forming a useable fuel product, which is easily transportable and efficiently combustible. Rotating drum or pan agglomerators are relatively low cost to build, and are capable of very high tonnage throughputs. Customized products can be produced and the present invention enhances the economics of ash and sulphur removal in coal upgrade plants.

Low technology applications in countries where there is little investment for efficient coal process plants can also easily utilize the present invention, therefore allowing the provision of high efficiency, environmentally friendly and cost effective process plants to be manufactured and operated. In such places, any materials not immediately useable are currently treated as waste and simply stockpiled in bigger and bigger piles, increasing the environmental hazard thereof.

EXAMPLE 2

Preparation

The biomass material is prepared for agglomeration. Depending on its raw state, it may be beneficial to carry out some grinding, screening or drying. The finer the raw feed is, the more effective the process. Preferably, (but not limiting), the moisture content of the feed is a maximum of 20-25%, preferably 10-15% (by weight).

Depending on the moisture content and chemical characteristics of the biomass material, the liquid feed is adjusted to suit. This will involve balancing the quantity of water relative to the binder and surfactants used.

The above parameters can be established during pre-testing of the process and apparatus. For biomass fines agglomeration, it has been found that between 20-25% of liquid binder (to weight of raw feed) is generally desired for efficient agglomeration. Generally, the wetter the biomass feed, the less water is required to be added at this stage.

Agglomeration

The fuel feed is carried along and any dry reagents are added to the feed. It then falls from the end of a conveyor belt. The liquid binder is sprayed onto the falling curtain of fines, which together fall into a rotating drum, generally 1-5 m (such as 3 m) in diameter. As the mixture tumbles while being sprayed with the binder and water mixture, it forms small pellets which agglomerate and grow, forming rigid pellets of desired shape and size as shown in FIG. 2.

The drum can be lined with loosely fitting heavy duty rubber sheet to avoid material sticking to the sides of the drum. The drum is set at an incline (e.g. 1-3%) to aid progression of the pellets therealong, and to control the residence time in the drum. The completed pellets exit at the opposite end of the drum onto another conveyor.

Pellets can be varied in size with only operational drum adjustments (speed of rotation, moisture content and longitudinal drum angle which directly affects residence time in the drum). Expensive mould changes, such as in present briquetting operations, are not required to vary the product dimensions.

Drying

Ambient air from a blower or other air driving apparatus is allowed to pass through a conjoined or separate, preferably separate, rotary drum, in order to accelerate the curing process of the pellets. The drum is preferably perforated to allow for ambient air to be blown through it whilst the drum is rotating. The perforations or any such other apertures may be covered by a protective mesh of a suitable material or a perforated covering, to avoid loss or displacement of the pellets from the drum whilst allowing ambient air to pass through the drum. The drying step may take place directly in line with or after the agglomerating process, and the completed pellets exit at the opposite end of the drum onto another conveyor.

Alternatively, the agglomerated pellets are moved via a further conveyor belt into a rotary drum where the second step of drying takes place separately.

The second rotary drum is preferably similar to but has a larger diameter than the agglomerating drum. It may also be of greater diameter and longer than the agglomeration drum. Here the pellets progress slowly through the drum, allowing sufficient time for the pellets to dry and preferably initially cure, and optionally receive any surface treatment, and to assist immediate handling and stacking. The residence time within this drum is dependent on the fuel characteristics, and its use can be determined in pre-production tests.

Selected surface treatment additives can be added at this stage to increase the surface area of the pellet skin, to prevent sticking, and/or to prevent leaking fluid into bags, etc.

Should the green strength of the pellets be poor, certain additional binders or cementitious chemicals can be added to rapidly speed-up the overall curing process, and thereby give quicker and stronger initial green strength to aid handling, or handleability, etc. Broken and undersized pellets can be removed using for instance a slotted section of drum or a vibrating screen at the drum exit. The damaged and undersized pellets can then be returned to the agglomerating drum for reprocessing.

Figure 4:
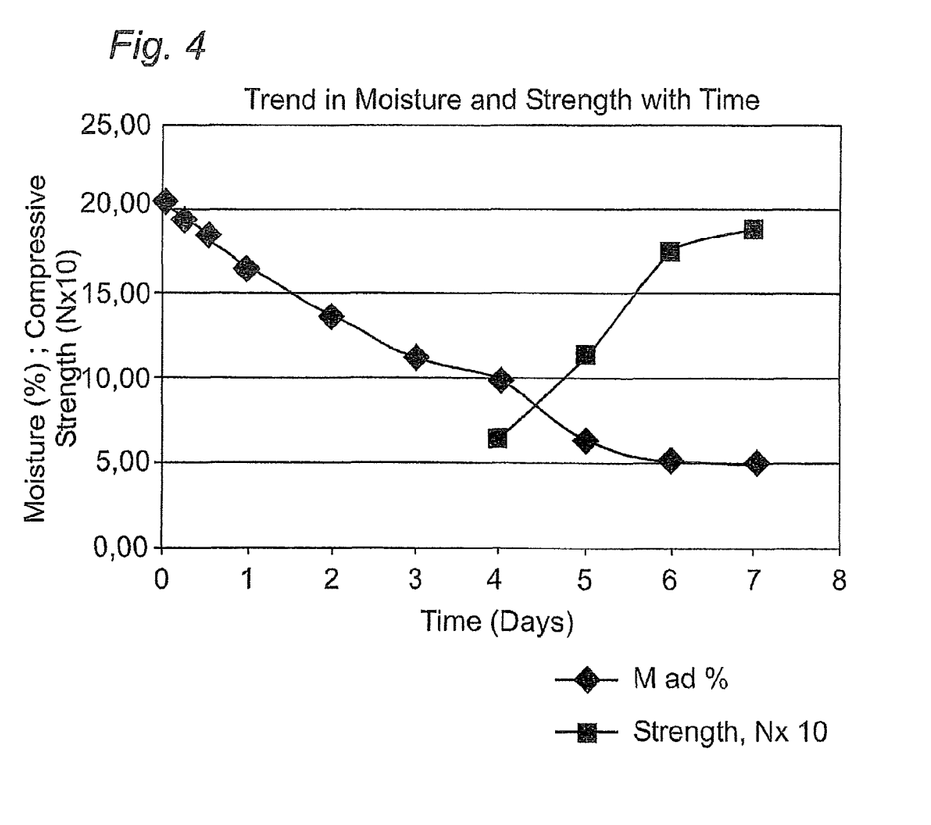
FIG. 4 is a graph showing moisture percentage and compression strengths graphed relative to time; and based on the process as shown in FIG. 1.

FIG. 4 shows the moisture reduction and strength increase for a wastewater sludge-based biomass pellet over time. The moisture content usually continues to reduce to 3 wt % or less over further time. Such pellets are clearly by then very strong, but still easily burnable.

Process rates can be selected, but production rates of between 10-100 tonnes per hour of biomass material per drum would be a general rate. The production rate can be scaled up using multiple process units, or scaled down with smaller equipment, optionally mobile units.

Figure 5:
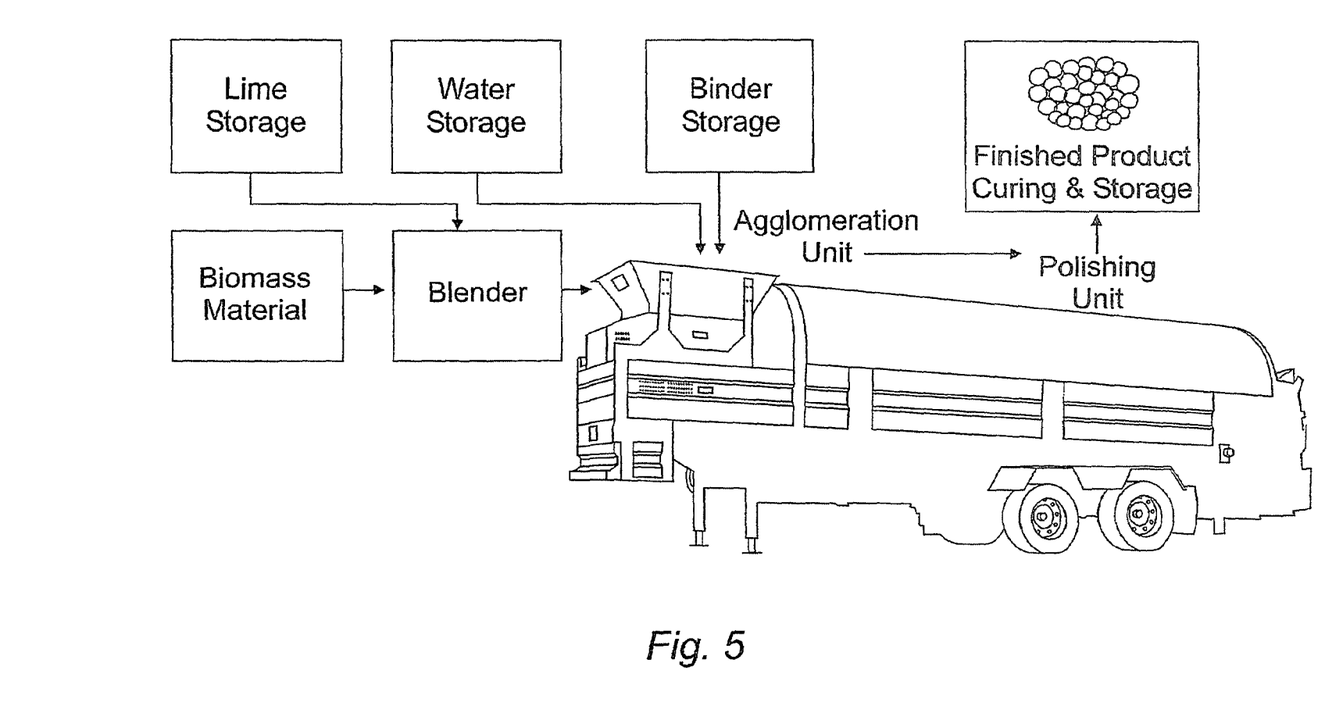
FIG. 5 is a flow chart showing the process of FIG. 1 as applied to equipment for performing the process.

FIG. 5 shows a commercially sized agglomerator unit useable with the present invention. It is clearly transportable.

Production costs are dependent upon the production rate, particle size distribution of the feed, and characteristics of the particulate materials. However, energy input per tonne of product has been measured at approximately 0.5 to 2 kWh, at least a hundred times less than the energy input needed for briquetting.

Using a biomass waste water sludge material, the pellets of Example 2 had an initial analysis of:

|  | As Received | Dry Basis |
|---|---|---|
| % Moisture | 17.88 | XXXX |
| % Ash | 24.07 | 29.31 |
| BTU/Lb | 8,262 | 10,060 |
| % Sulphur | 0.45 | 0.55 |
| MAF |  | 14,232 |

Results of pellets tested in FIG. 4 and formed by the process of the present invention were:

|  | Pellet | Dry Basis |
|---|---|---|
| % Moisture | 6.18 | XXXX |
| % Ash | 22.71 | 29.31 |
| BTU/Lb | 10,364 | 11,047 |
| % Sulphur | 0.68 | 0.72 |
| MAF |  | 14,576 |

The pellets clearly have a reduced moisture content, and an increased BTU/lb, without any significant energy input.

The present invention encompasses all combinations of various embodiments or aspects of the invention described herein. It is understood that any and all embodiments of the present invention may be taken in conjunction with any other embodiment to described additional embodiments of the present invention. Furthermore, any elements of an embodiment may be combined with any and all other elements of any of the embodiments to describe additional embodiments.

What is claimed is:

1. A combustible and burning pellet binder comprising; a burning a mixture of dried fuel pellet comprising:

| Silicate | 60-97 wt %; |
| Catalyst | 3-40 wt %; |
| Water | balance; and | wherein the catalyst comprises

| Glycol | 10-40 wt %; |
| Sulphonate | 10-20 wt %; |
| Sulphate | 5-10 wt %; and |
| Water | balance; and said mixture is a fuel pellet binder. |

2. A pellet binder as claimed in claim 1 wherein the silicate is sodium silicate or potassium silicate.

3. A pellet binder as claimed in claim 1 wherein the silicate comprises 75-95 wt %.

4. A pellet binder as claimed in claim 1 wherein the catalyst comprises 5-20 wt %.

5. A pellet binder as claimed in claim 1 wherein the sulphonate is a linear alkyl benzene sulphonate.

6. A pellet binder as claimed in claim 1 wherein the sulphonate is a sodium salt.

7. A pellet binder as claimed in claim 6 wherein the sulphonate is sodium dodecyl benzene sulphonate.

8. A pellet binder as claimed in claim 6 wherein the sulphate is sodium lauryl ether sulphate.

9. A pellet binder as claimed in claim 1 wherein the sulphate is one of a fatty alcohol sulphate and an alkyl sulphate.

10. A pellet binder as claimed in claim 1 wherein the glycol is a diol.

11. A pellet binder as claimed in claim 10 wherein the glycol is ethylene glycol.

12. The pellet binder as claimed in claim 1 used in a process for producing and burning fuel pellets at ambient temperature from at least a particulate material and the pellet binder as comprising of the following steps:
   admixing the particulate material and the pellet binder;
   agglomerating the so-formed mixture by tumbling to form pellets; and
   curing the fuel pellets after tumbling at ambient temperature to form rigid fuel pellets having a hardened shell; and burning the fuel pellets.

13. The product by a process as claimed in claim 12 for producing metal ore pellets from a particulate carbon-based material and a metal ore material.

14. The pellet binder as claimed in claim 1 used in a process for producing rigid fuel pellets at ambient temperature from a biomass material and the pellet binder and then burning, comprising the steps of:
   a) admixing the biomass material and binder, and
   b) agglomerating the so-formed mixture by tumbling at ambient temperature to form pellets; and
   c) curing the pellets at ambient temperature to form rigid fuel pellets having a hardened shell; and
   d) burning the pellets.

15. The product by a process as claimed in claim 14 further comprising the step of:
   drying the rigid fuel pellets using a flow of air before the burning step.

16. The product by a process as claimed in claim 14 wherein the biomass material is one or more of the group comprising: wastewater sludge, sewerage sludge, chicken litter, bonemeal, spent mushroom compost, wood, plant residues including rape seed, hemp seed, corn and sugar cane residues.

17. The product by process as claimed in claim 12 wherein the binder is sprayed on to the particulate material.

18. The product by process as claimed in claim 12 having a variable density towards its core.

19. The product by process as claimed in claim 18 being formed from a coal dust or coal fines.

20. The product by process as claimed in claim 12 wherein the pellet has a moisture content of <5%.

\* \* \* \* \*